United States Patent [19]

Langner et al.

[11] Patent Number: 5,140,472
[45] Date of Patent: Aug. 18, 1992

[54] APPARATUS FOR BRIGHTENING COCKPIT INSTRUMENTS

[76] Inventors: Klaus Langner, Alte Dorfstr. 61, 7770 Überlingen; Klaus Runge, Mühlenstr. 5a, 7772 Uhldingen 1, both of Fed. Rep. of Germany

[21] Appl. No.: 580,149

[22] Filed: Sep. 10, 1990

[30] Foreign Application Priority Data

Sep. 12, 1989 [DE] Fed. Rep. of Germany ....... 3930359

[51] Int. Cl.⁵ .............................................. G02B 7/18
[52] U.S. Cl. .................... 359/871; 244/129.1; 244/129.3; 362/62
[58] Field of Search ............... 359/841, 843, 844, 871; 244/129.1, 129.3; 296/215; 362/62, 77

[56] References Cited

U.S. PATENT DOCUMENTS

| | | | |
|---|---|---|---|
| 2,375,134 | 5/1945 | Ptáček | 359/861 |
| 2,695,354 | 11/1954 | Neugass | 362/31 |
| 3,559,929 | 2/1971 | Lindsay, Jr. | 244/129.1 |
| 4,072,406 | 2/1978 | Amesburg . | |
| 4,729,634 | 3/1988 | Raber . | |
| 4,905,935 | 3/1990 | Uram, Jr. | 244/129.3 |
| 5,056,854 | 10/1991 | Rosen | 244/1 R |

FOREIGN PATENT DOCUMENTS 0088281 6/1983 European Pat. Off. .
2056740 3/1981 United Kingdom .

Primary Examiner—Bruce Y. Arnold
Assistant Examiner—J. P. Ryan
Attorney, Agent, or Firm—Lee, Mann, Smith McWilliams, Sweeney & Ohlson

[57] ABSTRACT

The apparatus for brightening cockpit instruments contains a passive optical brightening device for directing daylight which shines through front windows of the cockpit, to impinge upon the viewer-oriented cockpit instrument surface.

10 Claims, 3 Drawing Sheets

APPARATUS FOR BRIGHTENING COCKPIT INSTRUMENTS

BACKGROUND OF THE INVENTION

The present invention relates to a new and improved construction of an apparatus for brightening cockpit instruments.

In its more particular aspects, the present invention specifically relates to a new and improved construction of an apparatus for brightening cockpit instruments by means of daylight shining through front windows of the cockpit. A daylight throughpass opening is provided in a vizor arranged at an instrument panel containing the cockpit instruments. Optical deflection means are associated with the daylight throughpass opening for brightening cockpit instruments.

The cockpit of an aircraft is subjected to continuously changing light incidence directions and light intensities due to changing flight conditions. Various provisions have been taken for preventing exposure of the pilot to undesirable glare and reflections. It is for this reason that, for example, the cockpit is dark colored. The incidence of light or daylight into the cockpit is reduced such that thereby the outlook from the aircraft is optimized.

However, problems still result in reading the cockpit instruments during day-time. The viewer's or pilot's eye is adapted to the high brightness of the daylight incident through the front window of the cockpit. Reading of the instruments is rendered difficult due to the brightness difference between the field of view defined by the front window and the dark cockpit.

The night-time illumination installed in the instrument panel containing the cockpit instruments is designed for dark-adapted eyes. Such night-time illumination can hardly contribute to improving the readability of the cockpit instruments during day-time. Increasing the intensity of the "active" night-time illumination of the cockpit instruments would have the undesirable effects of additional power requirements, additional heat generation as well as added and heavier wiring resulting in additional weight.

In an instrument lighting apparatus used in connection with, for instance, aircraft and as known, for example, from German Published Patent Application No. 2,944,537, published May 22, 1980, there are present, in addition to an internal light source, means for directing daylight to the instruments. For this purpose, there is provided a light guide which extends through an upper upholstery or a glare protection towards the front window and which has an edge surface through which incident daylight is passed into the light guide. The light guide is constructed as a plate extending on the rear side of the scale-carrying member as seen by the viewer. The light guide has a rear side which is remote from the scale-carrying members of the instrument panel and constitutes a reflecting surface. The light guide has a front side which faces the scale-carrying members of the instrument panel and constitutes a light emitting surface emitting the incident deflected day-light. In this arrangement the incident daylight thus is passed to the rear of the instrument panel remote from the side facing the viewer and the desired brightening is caused by the daylight which is transmitted or throughpassed through the scale-carrying members. A similar device has been disclosed in U.K. Patent application GB 2,056,740 A, published Mar. 18, 1981.

German Utility Model No. 1,955,159, granted Dec. 14, 1966, is directed to a device for indirectly illuminating the scale of measuring instruments. In this device, the light which is emitted by a light source located on the rear of a scale as seen by the viewer, is passed through a light guide and a bent-off portion of a cover plate to a total-reflecting layer wherefrom the light is shined upon the front surface of the scale. There are no means provided for using daylight in this device to brighten the scale. A similar device is known from European Patent application 0,088,281 A1, published Sep. 14, 1983.

A publication entitled "Light-Valve Display" in the Journal "Neues aus der Technik", issue no. 4, page 4, dated Dec. 15, 1988, is concerned with an arrangement in which diffuse light originating from a concave mirror is throughpassed through parallel slots of a shutter and a facetted grating facing the viewer. The inactive facets of the grating are blackened in order to minimize internal and external reflections and the formation of double images.

German Patent No. 739,720, issued Oct. 2, 1943, relates to a synthetic glass plate covering an instrument panel. The synthetic glass is opaque on the viewer's side and contains cut-outs in the region of the instruments. A light source is inserted into the synthetic glass plate for shining diffuse light upon the instruments.

German Published Patent Application No. 3,245,299, published Jun. 14, 1984, relates to indicator means in a motor vehicle, particularly a dashboard provided with electronic brightness control means associated with the indicating elements. Additionally, there are provided photodetectors which respectively respond to the daylight impinging upon the instrument panel and the daylight entering the interior of the motor vehicle through the front window. The photodetectors are connected to the electronic brightness control means whereby the same is made dependent upon the incident daylight.

U.S. Pat. No. 2,695,354, granted Nov. 23, 1954, is concerned with instrument panel lighting in an aircraft using glare-free indirect illumination by means of a synthetic glass plate.

U.S. Pat. No. 2,375,134 relates to a mirror globe arranged in an aircraft pilot's field of view. A plural number of further mirrors which are placed at the aircraft, are aligned to the mirror globe. The pilot is thereby enabled to observe various parts of the aircraft and their environment.

SUMMARY OF THE INVENTION

From U.S. Pat. No. 4,729,634, dated May. 8, 1988, an optical arrangement is known in which the display image of a conventional cathode ray tube is projected onto the pilot's side of a cockpit window by means of converging mirror elements, combining a remote image viewed by the pilot with a display image provided by the cathode ray tube.

U.S. Pat. No. 4,072,406, dated Feb. 7, 1978 discloses a camera periscope presenting low visual obstruction to the views having a housing carried on the camera body including a glass cube beam-splitter to convey part of the image viewed by the pilot to the camera.

Therefore, with the foregoing in mind it is a primary object of the present invention to provide a new and improved construction of an apparatus for brightening cockpit instruments and which apparatus is not afflicted with the drawbacks and limitations of the prior art heretofore discussed.

Another and more specific object of the present invention is directed to providing an apparatus for brightening cockpit instruments and which apparatus can be installed without requiring re-construction of the instrument panel containing the cockpit instruments.

Now in order to implement these and still further objects of the invention, which will become more readily apparent as the description proceeds, the apparatus of the present development is manifested by the features that, among other things, the daylight throughpass opening and the optical deflection means are arranged forwardly of the cockpit instruments as seen in the viewing direction of the viewer. The optical deflection means constitute a deflecting mirror for deflecting the daylight towards and to impinge upon the cockpit instruments on the side facing the viewer.

According to the invention, brightening of the cockpit instruments is thus effected in "passive" manner by utilizing daylight which is incident upon and not through-passed through the instrument panel. The brightening of the cockpit instruments is automatically matched to the brightness existing outside of the aircraft and to the adaptive state of the pilot's or viewer's eye. Using the inventive construction, no additional installation or special reconstruction are necessary in the instrument panel containing the cockpit instruments.

BRIEF DESCRIPTION OF THE DRAWINGS

The invention will be better understood and objects other than those set forth above, will become apparent when consideration is given to the following detailed description thereof. Such description makes reference to the annexed drawings wherein the same or analogous components are designated by the same reference characters and wherein.

DETAILED DESCRIPTION OF THE PREFERRED EMBODIMENTS

Figure 1:
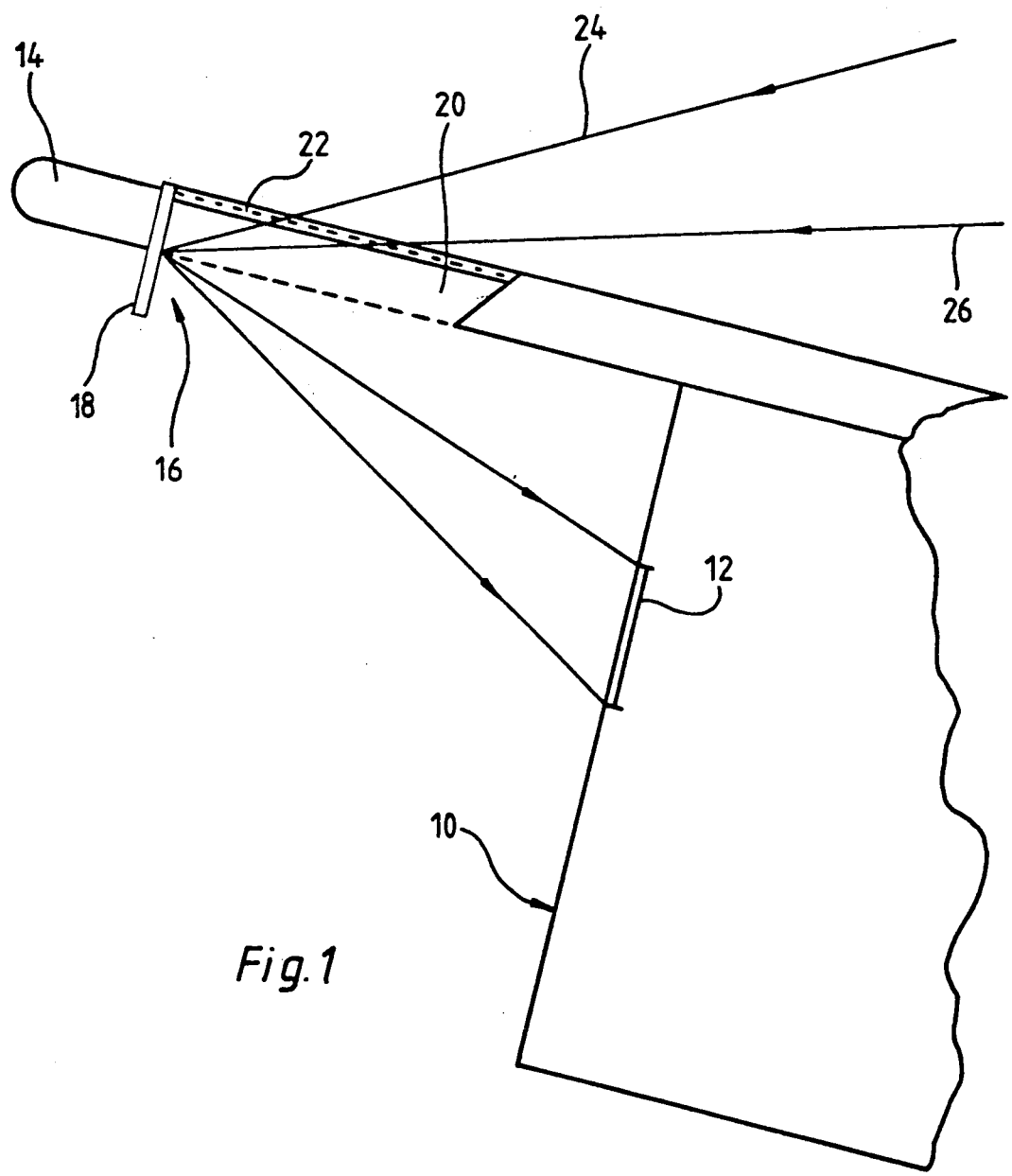
FIG. 1 is a schematic vertically sectional view of part of a cockpit containing a cockpit instrument panel and a vizor and provided with an exemplary embodiment of the inventive brightening apparatus.

Describing now the drawings, it is to be understood that only enough of the construction of the brightening apparatus has been shown as needed for those skilled in the art to readily understand the underlying principles and concepts of the present development, while simplifying the showing of the drawings. Turning attention now specifically to FIG. 1 of the drawings, there is shown therein an instrument panel 10 which is located in the cockpit of an aircraft. The instrument panel 10 contains a plurality of cockpit instruments of which the cockpit instrument 12 is schematically indicated. The cockpit instrument 12 may constitute, for example, a liquid crystal display unit. A vizor 14 is schematically indicated as extending on a top side of the instrument panel 10 and protruding in a direction toward the pilot or viewer. A front window of the cockpit is located above the vizor 10.

Although in the present description the inventive brightening apparatus is described in connection with the cockpit instrument panel of an aircraft, such description is merely made as a matter of explanation but not limitation. Thus, it will be immediately apparent to a person skilled in the art that brightening means of this type can be employed in the same or corresponding manner and for the same purpose in connection with other types of vehicles or installations in which the instrument panel is subject to variable environmental lighting conditions.

The cockpit instrument 12 is illuminated by means of a brightening apparatus generally designated by the reference character 16. Using such brightening apparatus 16, daylight from the front window of the cockpit can be specifically aimed at the cockpit instrument 12 or, if desired, a greater number of other cockpit instruments present at the instrument panel 10.

The brightening apparatus 16 contains a deflection mirror 18 inserted into the vizor 14 which is provided with a light throughpass opening 20. A transparent cover 22 covers the light throughpass opening 20 and may be made of acrylic glass or may constitute, for example, a grid. The deflecting mirror may comprise, for instance, a rolled and polished aluminum sheet.

As will be apparent from the illustration of FIG. 1, the daylight which enters the cockpit through its front window, passes through the light throughpass opening 20 and impinges upon the deflecting mirror 18. The incident light which is indicated by the rays 24 and 26, is passed on to the cockpit instrument 12. There is thus effected a brightening of the cockpit instrument 12 even if the same, as presently illustrated, is located relatively closely below the vizor 14. The brightening effect increases with increasing intensity of the light which enters through the front window, and thus becomes automatically matched to the brightness of the field of view observed by the pilot or viewer.

Figure 3:
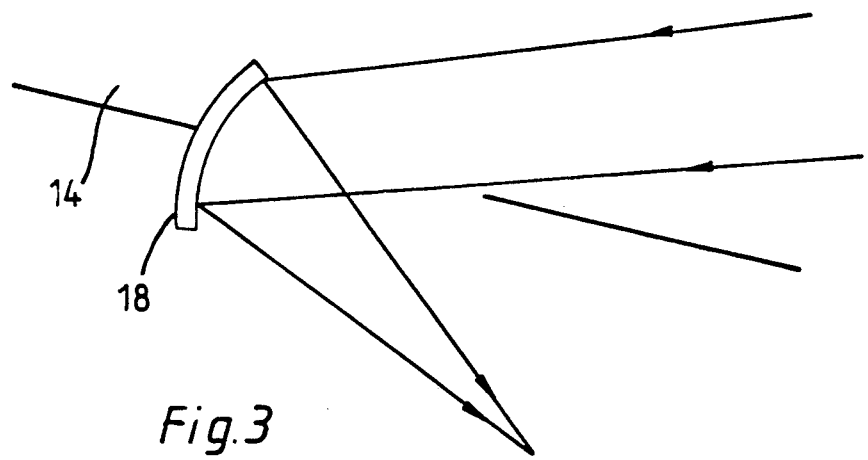
FIGS. 3, 4 and 5 are respective similar views of parts of further modifications of the inventive brightening apparatus.
Figure 4:
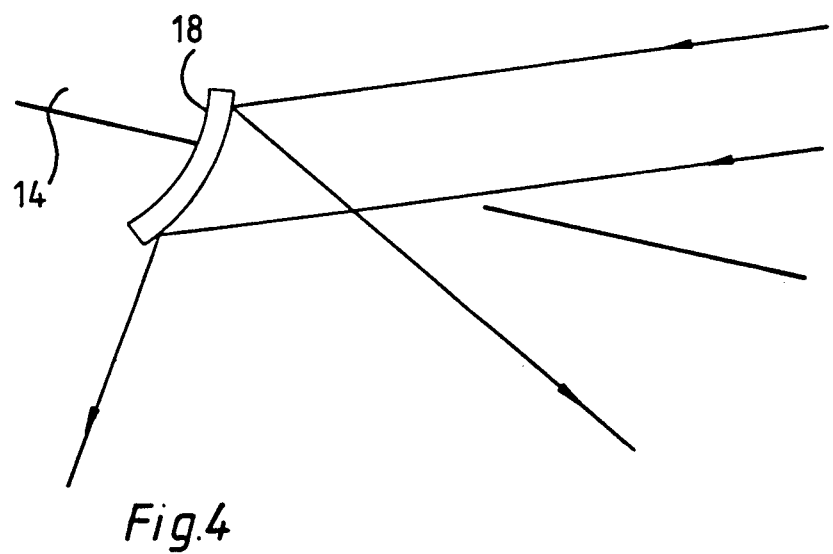

The deflecting mirror 18 may constitute a flat or planar mirror as shown in FIG. 1. The deflecting mirror 18, as schematically illustrated respectively in FIGS. 3 and 4, may also have a concave or convex shape. Furthermore, the deflecting mirror 18 may be constructed in a manner such as to have different curvatures in horizontal and in vertical section, respectively. By selecting a deflecting mirror 18 of an appropriate shape the daylight or light rays which enter the cockpit through its front window, can be distributed across the instrument panel 10 pratically in any desired manner.

Figure 2:
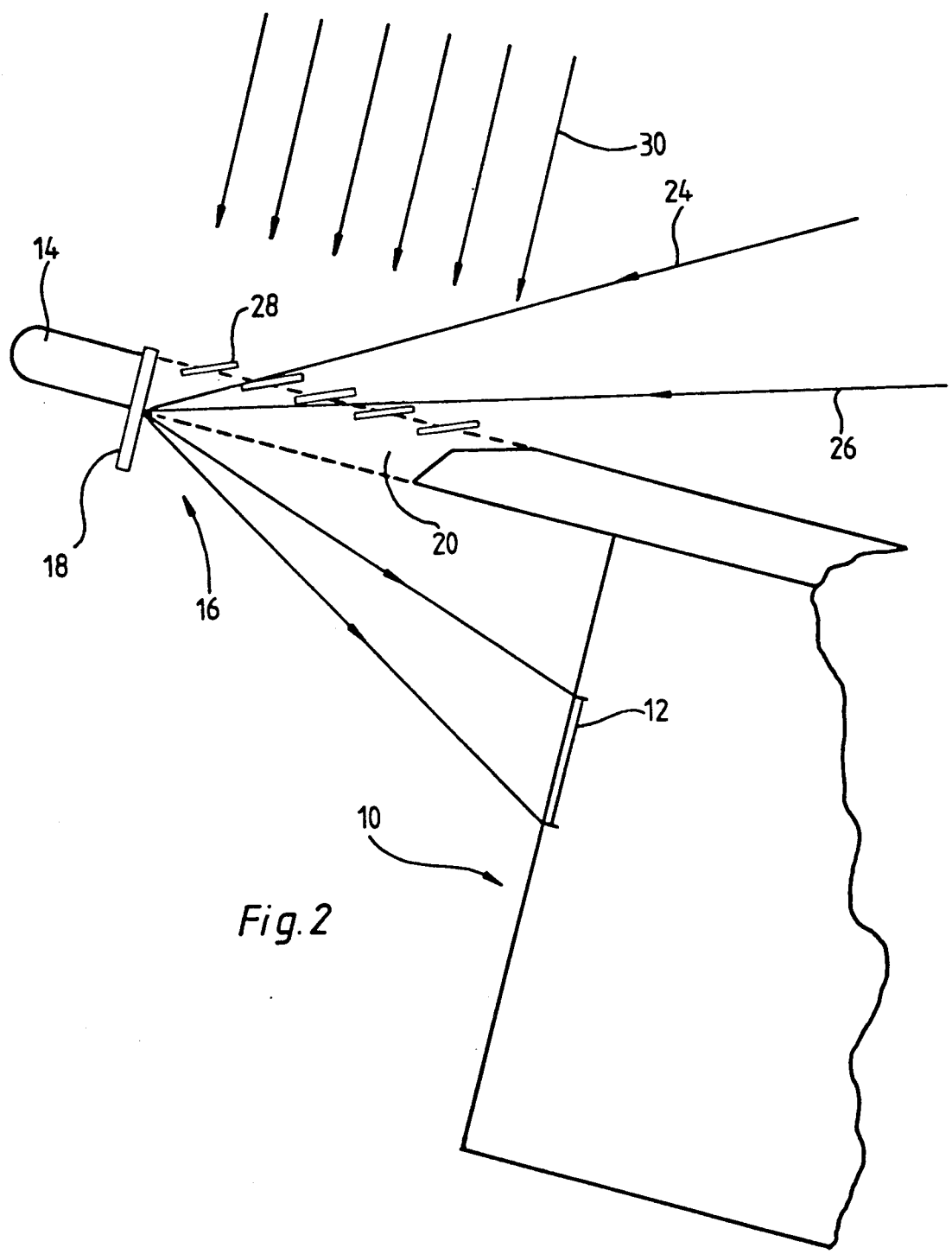
FIG. 2 is a similar view showing a modification of the inventive brightening apparatus.

The modified arrangement illustrated in FIG. 2, extensively conforms with the arrangement shown in FIG. 1 and, therefore, corresponding elements are designated by the same reference numbers. Instead of the transparent cover 22 which covers the light throughpass opening 20 in the vizor 14 in the exemplary embodiment shown in FIG. 1, the light throughpass opening 20 is covered in the modified embodiment by means of a blind-like shutter 28 constructed substantially in the manner of a Venetian blind. The blind-like shutter 28 permits only daylight of a predetermined angular range as defined, for example, by the light rays 24 and 26 to pass through the blind-like shutter 28. There is thus prevented daylight incidence from undesired incidence directions 30 such as, for example, from above.

Figure 5:
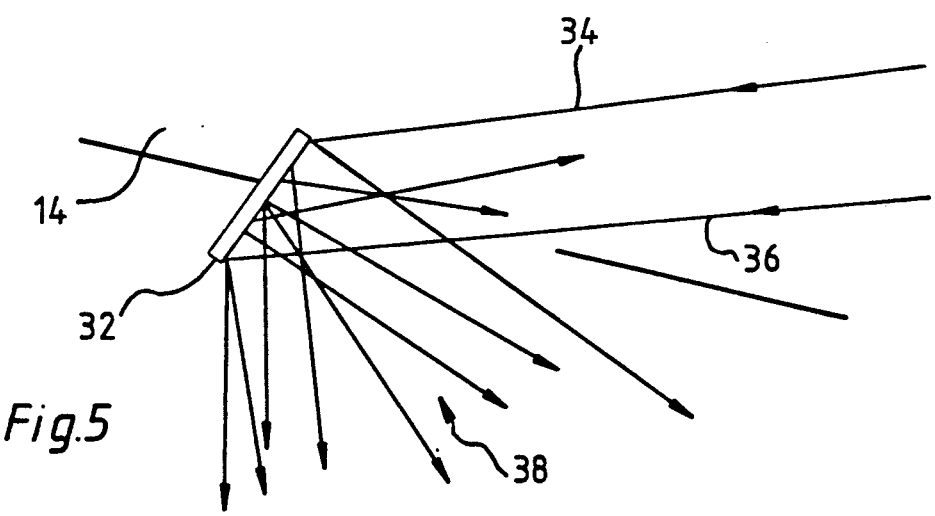

In the further modified apparatus schematically illustrated in FIG. 5, the brightening apparatus contains, instead of the deflecting mirror 18 shown in FIGS. 1 to 4, a diffusely reflecting element 32 which is impinged upon by the daylight and reflects the same as diffuse light toward the instrument panel containing the cockpit instruments. In FIG. 5, reference characters 34 and 36 designate incident light rays of daylight. The reflected rays of diffuse light are generally designated by reference character 38. In other respects, the modified brightening apparatus illustrated in FIG. 5 corresponds to the exemplary embodiment shown in FIG. 1.

While there are shown and described present preferred embodiments of the invention, it is to be distinctly understood that the invention is not limited thereto, but may be otherwise variously embodied and practiced within the scope of the following claims. Accordingly,

What is claimed is:

1. An apparatus for brightening cockpit instruments in an instrument panel in the cockpit of an aircraft, comprising:
   a vizor arranged at the instrument panel and protruding from said instrument panel into the interior of the cockpit;
   said vizor containing a light throughpass opening for throughpassing daylight entering said cockpit through front windows of said cockpit;
   optical deflection means associated with said light throughpass opening for deflecting said daylight in order to brighten at least one cockpit instrument present in said instrument panel;
   said light throughpass opening and said optical deflection means being located in front of said instrument panel as seen in the viewing direction of a viewer toward said instrument panel; and
   said optical deflection means constituting a deflecting mirror deflecting said daylight which has passed through said light throughpass opening in said vizor, onto said at least one cockpit instrument in said instrument panel on a side facing said viewer.

2. The apparatus as defined in claim 1, wherein:
   said vizor defines an inner rim of said light throughpass opening; and
   said deflecting mirror being attached to the inner rim of said light throughpass opening.

3. The apparatus as defined in claim 1, further including:
   a transparent cover covering said light throughpass opening in said vizor.

4. The apparatus as defined in claim 1, wherein:
   said deflecting mirror constitutes a flat mirror.

5. The apparatus as defined in claim 1, wherein:
   said deflecting mirror constitutes a convex mirror.

6. The apparatus as defined in claim 1, wherein:
   said deflecting mirror constitutes a concave mirror.

7. The apparatus as defined in claim 1, wherein:
   said deflecting mirror possesses a predeterminate curvature in horizontal section as well as in vertical section; and
   said predetermined curvatures in said horizontal section and in said vertical section being different from each other.

8. The apparatus as defined in claim 1, further including:
   a blind constructed in the manner of a Venetian blind; and
   said blind being associated with said light throughpass opening in said vizor for adjusting an angular range of daylight passing through said light throughpass opening.

9. The apparatus as defined in claim 1, wherein:
   said deflecting mirror is made of rolled and polished aluminum sheet.

10. The apparatus as defined in claim 1, wherein:
    said deflecting mirror contains a diffuse reflecting element for reflecting in a diffuse condition said daylight which has passed through said light throughpass opening in said vizor, onto said at least one cockpit instrument in said instrument panel on a side facing said viewer.

* * * * *